United States Patent
Foncubierta Rodriguez et al.

(10) Patent No.: US 10,769,425 B2
(45) Date of Patent: Sep. 8, 2020

(54) METHOD AND SYSTEM FOR EXTRACTING INFORMATION FROM AN IMAGE OF A FILLED FORM DOCUMENT

(71) Applicant: International Business Machines Corporation, Armonk, NY (US)

(72) Inventors: Antonio Foncubierta Rodriguez, Zurich (CH); Maria Gabrani, Thalwil (CH); Guillaume Jaume, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/101,763

(22) Filed: Aug. 13, 2018

(65) Prior Publication Data

US 2020/0050845 A1   Feb. 13, 2020

(51) Int. Cl.
*G06K 9/00* (2006.01)

(52) U.S. Cl.
CPC ..... *G06K 9/00449* (2013.01); *G06K 9/00456* (2013.01); *G06K 9/00463* (2013.01); *G06K 2209/01* (2013.01)

(58) Field of Classification Search
CPC .......... G06K 9/00449; G06K 9/00463; G06K 9/00456; G06K 2209/01; G06F 40/174; G06F 16/93
USPC .......................................... 382/176, 209, 218
See application file for complete search history.

(56) References Cited

U.S. PATENT DOCUMENTS

| | | | |
|---|---|---|---|
| 9,374,501 B2 * | 6/2016 | Wshah | G06K 9/00 |
| 10,417,489 B2 * | 9/2019 | Carroll | H04N 1/3873 |
| 2011/0249905 A1 | 10/2011 | Singh et al. | |
| 2015/0248393 A1 | 9/2015 | Watanabe | |
| 2016/0055376 A1 | 2/2016 | Koduru | |
| 2016/0255235 A1 | 9/2016 | Wshah et al. | |
| 2017/0322912 A1 | 11/2017 | Craven et al. | |

* cited by examiner

*Primary Examiner* — Daniel G Mariam (74) *Attorney, Agent, or Firm* — Scully, Scott, Murphy & Presser, P.C.; Daniel P. Morris (57) ABSTRACT

A method of determining a hierarchy of a blank template using an image of the blank template and using the determined hierarchy for providing labels and field values of text lines of a filled form document.

14 Claims, 5 Drawing Sheets

| 301A—<br>301B— | 14. Did use of the product stop after the side effect appeared? | 15. If the product was stopped, did the side effect stop? | —305A<br>—305B |
|---|---|---|---|
| | ☐ Yes —302A<br>☐ No —302B | ☐ Yes —306A<br>☐ No —306B<br>☐ Does not apply —306C | |
| 303A—<br>303B— | 16. Was the product restarted after the side effect stopped? | 17. If the product was restarted, did the side effect return? | —307A<br>—307B |
| 304A—<br>304B—<br>304C— | ☐ Yes<br>☐ No<br>☐ Does not apply | ☐ Yes —308A<br>☐ No —308B<br>☐ Does not apply —308C | |

| 301— | 14. Did use of the product stop after the side effect appeared? | 15. If the product was stopped, did the side effect stop? | —305 |
|---|---|---|---|
| 302— | ☐ Yes<br>☐ No | ☐ Yes<br>☐ No<br>☐ Does not apply | —306 |
| 303— | 16. Was the product restarted after the side effect stopped? | 17. If the product was restarted, did the side effect return? | —307 |
| 304— | ☐ Yes<br>☐ No<br>☐ Does not apply | ☐ Yes<br>☐ No<br>☐ Does not apply | —308 |

Fig. 3B

```
{                                                  ╱400
    "text" : "4-6 REACTION ONSET",
    "questions" : [
        {
            "question_text" : "Day", ⎫
            "answer" : "27",
            "tickbox" : false,
            "bbox" : [
                1620.0,                ⎬─401A
                948.0,
                1700.0,
                879.0
            ],
            "confidence" : 92.0    ◄── 402A
        },
        {
            "question_text" : "Month",⎫
            "answer" : "04",
            "tickbox" : false,
            "bbox" : [
                1710.0,                ⎬─401B
                949.0,
                1835.0,
                879.0
            ],
            "confidence" : 91.0    ◄── 402B
        },
        {
            "question_text" : "Year",⎫
            "answer" : "2013",
            "tickbox" : false,
            "bbox" : [
                1841.0,                ⎬─401C
                949.0,
                1929.0,
                879.0
            ],
            "confidence" : 92.5    ◄── 402C
        }
    ]
},
```

Fig. 4

METHOD AND SYSTEM FOR EXTRACTING INFORMATION FROM AN IMAGE OF A FILLED FORM DOCUMENT

BACKGROUND

The present disclosure relates to the field of digital computer systems, and more specifically, to a method for extracting information from an image of a filled form document.

Computer systems of service providers usually include databases for storing information related to customers and services. Some of the information may be provided when the customers fill in registration forms and service request forms. The forms may dynamically change (e.g. the size of a text box may change) depending on the content that the user inputs. However, as the forms are stored in image format e.g. scanned forms, the extraction of information of the forms may be a challenging technical task.

SUMMARY

Various embodiments provide a method for extracting information from an image of a filled form document, computer system, and computer program product as described by the subject matter of the independent claims. Advantageous embodiments are described in the dependent claims. Embodiments of the present invention can be freely combined with each other if they are not mutually exclusive.

In one aspect, the disclosure relates to a method for extracting information from an image of a filled form document, the form document comprising labeled fields having values and arranged in sections of the document. In one embodiment, the method comprises:
providing an image of a blank template of the form document;
extracting first text lines from the image of the blank template using a text line recognizer of an optical character recognition (OCR) system;
performing using the OCR system an optical character recognition of the extracted first text lines resulting in first machine-encoded text lines;
merging the first machine encoded text lines into candidate sections based on the location of the first text lines in the blank template;
evaluating for each candidate section a set of predefined features indicative of the text lines and their location;
combining the evaluated features of each candidate section to generate an identifier of the candidate section, resulting in multiple identifiers;
determining sets of candidate sections that each share a respective identifier of the multiple identifiers;
selecting a set of candidate sections of the sets of sections that fulfills a predefined selection criterion based on the number of sections and number of respective fields;
determining as the hierarchy of the blank template the selected set of candidate sections;
extracting second text lines from the image of the filled form document using the text line recognizer;
performing using the OCR system an optical character recognition of the extracted second text lines resulting in second machine-encoded text lines;
merging the second machine encoded text lines into text regions based on the location of the second text lines;
for each second text line of the filled form document:
identifying the section of the determined hierarchy that matches the second text line based on the region of the second text line;
determining the first text line of the section that corresponds to the second text line by comparing the second text line with the first text lines, and determining the label of the field of the second text line and the position of the label within the filled form using the determined first text line;
using the determined labels for identifying and extracting field values of the second text lines;
comparing each of the field values with the determined labels for assigning the field value to a respective label of the determined labels.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to a computer system for computer system for extracting information from an image of a filled form document, the form document comprising labeled fields having values and arranged in sections of the document, the computer system comprising an image of a blank template of the form document. In one embodiment, the computer system is configured for:
extracting first text lines from the image of the blank template using a text line recognizer of an OCR system;
performing using the OCR system an optical character recognition of the extracted first text lines resulting in first machine-encoded text lines;
merging the first machine encoded text lines into candidate sections based on the location of the first text lines in the blank template;
evaluating for each candidate section a set of predefined features indicative of the text lines and their location;
combining the evaluated features of each candidate section to generate an identifier of the candidate section, resulting in multiple identifiers;
determining sets of candidate sections that each share a respective identifier of the multiple identifiers;
selecting a set of candidate sections of the sets of sections that fulfills a predefined selection criterion based on the number of sections and number of respective fields;
determining as the hierarchy of the blank template the selected set of candidate sections;
extracting second text lines from the image of the filled form document using the text line recognizer;
performing using the OCR system an optical character recognition of the extracted second text lines resulting in second machine-encoded text lines;
merging the second machine encoded text lines into text regions based on the location of the second text lines;
for each second text line of the filled form document:
identifying the section of the determined hierarchy that matches the second text line based on the region of the second text line;
determining the first text line of the section that corresponds to the second text line by comparing the second text line with the first text lines and determining the label of the field of the second text line and the position of the label within the filled form using the determined first text line;
using the determined labels for identifying and extracting field values of the second text lines;

comparing each of the field values with the determined labels for assigning the field value to a respective label of the determined labels.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Design of forms may change with time even if they keep gathering the same information from the users and thus the blank templates may not be aligned to the corresponding filled forms. The present method may solve this issue of forms that have a varying layout. The present method may enable to find the structure in empty form and to link answers to questions in the filled form. The present method may allow for inconsistency between the blank and filled forms. Thus, the present method may particularly be advantageous as the filled form may change in structure compared to respective blank template because of filling fields. The present method may further be less sensitive to noise values in a filled form document as the comparison between the blank template and filled form is performed based on an accurate determination of the form of the blank template.

For example, the present method may not rely on a geometrical reference of a master form that can be aligned to a filled form e.g. the present method may rely on semantic consistencies between the blank template and filled form. The analysis and extraction of the hierarchical structure of a form using a blank template allows the method to be robust to geometrical differences with respect to the master form as long as the hierarchy is preserved.

The present method may enable ingesting documents for performing an accurate and systematic cognitive analysis. This method may particularly be advantageous in case of a high number of filled forms (E.g. there is significant amount of documents which are in the form of images (e.g. documents scanned or faxed)) that need to be interpreted and analyzed.

The present method may enable to identify questions (a label of a field may be a question) and related answers (the value of a field may be part of the answer to the question which is the label of the field. The answer may further comprise other supplemental text such as the format of a date being value of the field) in a filled form document. The texts of the filled form obtained by optical character recognition (OCR) processing are compared in a first comparison step with the texts obtained from an empty form that is a template of the filled form. The first comparison step results in identifying questions in the filled form and in particular the position of the identified questions within the filled form. For example, a position of a given question may be determined by the position of the bounding box that surrounds the given question. The position of the bounding box may be determined using a coordinate system of the form document (e.g. the origin of the coordinate system may be the top left corner of the form document). The position of the bounding box may for example be the width, height of the box and x and y position of the top left of the box with respect to the origin of the coordinate system. The first comparison step may be performed using for example similarity distances between the compared texts. Knowing the questions of the filled form, the answers may be extracted from the texts of the filled form (the questions may be subtracted from the text obtained from the filled form to obtain the remaining text as an indication of the answers). In a second comparison step the answers are compared to the questions in particular to the position of the questions to map each answer to corresponding question. The second comparison may for example be performed using a machine learned model that can predict for each answer the probability that a given question corresponds to that answer. The highest probability may indicate the pair question and answer.

According to one embodiment, the comparing of the first and second text lines is performed using a similarity metric indicative of the similarity between words of the first and second text lines. The similarity metric may for example comprise at least one of Levenshtein distance, word accuracy, WA, combined word accuracy, CWA, and field detection accuracy, FDA.

A text line as used herein may comprise at least one of: a field (e.g. a text field) a label of the field, value of the field (e.g. value in text field) and supplementary information descriptive of the field (e.g. for a text filed having age value, the supplementary information may indicate the format of the date).

According to one embodiment, the selection criterion is the following:

$$\min_h \frac{|S|}{\frac{1}{|S|}\sum_{i=0}^{|S|-1}|Q_i|},$$

where S is the number of candidate sections shared by a given identifier and Q is the number of fields in a given candidate section.

According to one embodiment, the selection criterion is the following:

$$\min_h \frac{|S|}{\text{median}\{|Q|\}},$$

where S is the number of candidate sections shared by a given identifier and median{Q} is the median number of fields for a given hierarchy. These embodiments may provide an accurate and systematic method for detecting the structure of a form document.

According to one embodiment, the combining of the evaluated features into an identifier h is performed as follows $h=\Sigma_{n=0}^{M} f_n \cdot 2^n$ where $f_n$ represents the $n^{th}$ feature of M features. This may enable to provide a different identifier for each different section.

According to one embodiment, the set of predefined features comprises at least one of: font size, font type, position of a character, numbering, background color, indication of a character being an uppercase or lowercase character. The predefined features are features that are all the same for all the sections of a given form document e.g. a form document a used herein has sections which have similar structure in term of size of characters used, font type background color etc.

According to one embodiment, the comparing of the field value with a label of the determined labels comprises computing a probability that the field value and the label corresponds to each other using visual features, wherein the visual features comprise L1 distance between centroids of bounding boxes of the compared label and field value, L1 distance between top-left corners of bounding boxes of the compared label and field value, L1 distance between closest borders of bounding boxes of the compared label and field value.

This embodiment may enable to analyze the hierarchy of the data and mapping texts learnt from the empty form to their most probable answers in the filled in form.

In one example, the probability that the field value and the label correspond to each other may be determined using a machine learning model. The machine learning model is generated such that for each field value, it outputs a probability of the field value is linked with a label of the determined labels. The pair of (label, field value) that has the highest probability may be selected and provided e.g. the field value of that pair is determined as corresponding to the label of that selected pair.

For example, a supervised learning algorithm may be trained on a predefined training set so as to generate the machine learning model. The training set may comprise for example field values which are labeled with corresponding questions. The learning algorithm may for example comprise a support vector machine, (SVM) learning algorithm or a random decision forests learning algorithm.

According to one embodiment, the merging of the machine encoded text lines is performed using a vertical merging technique.

According to one embodiment, the identifier of the text region comprises a hash value.

According to one embodiment, the method further comprises providing the hierarchy of the filled form document as an xml file or JSON file. This may enable to perform queries and parsing operations on the files so as to perform analysis of information extracted from the filled form documents.

Figure 1:
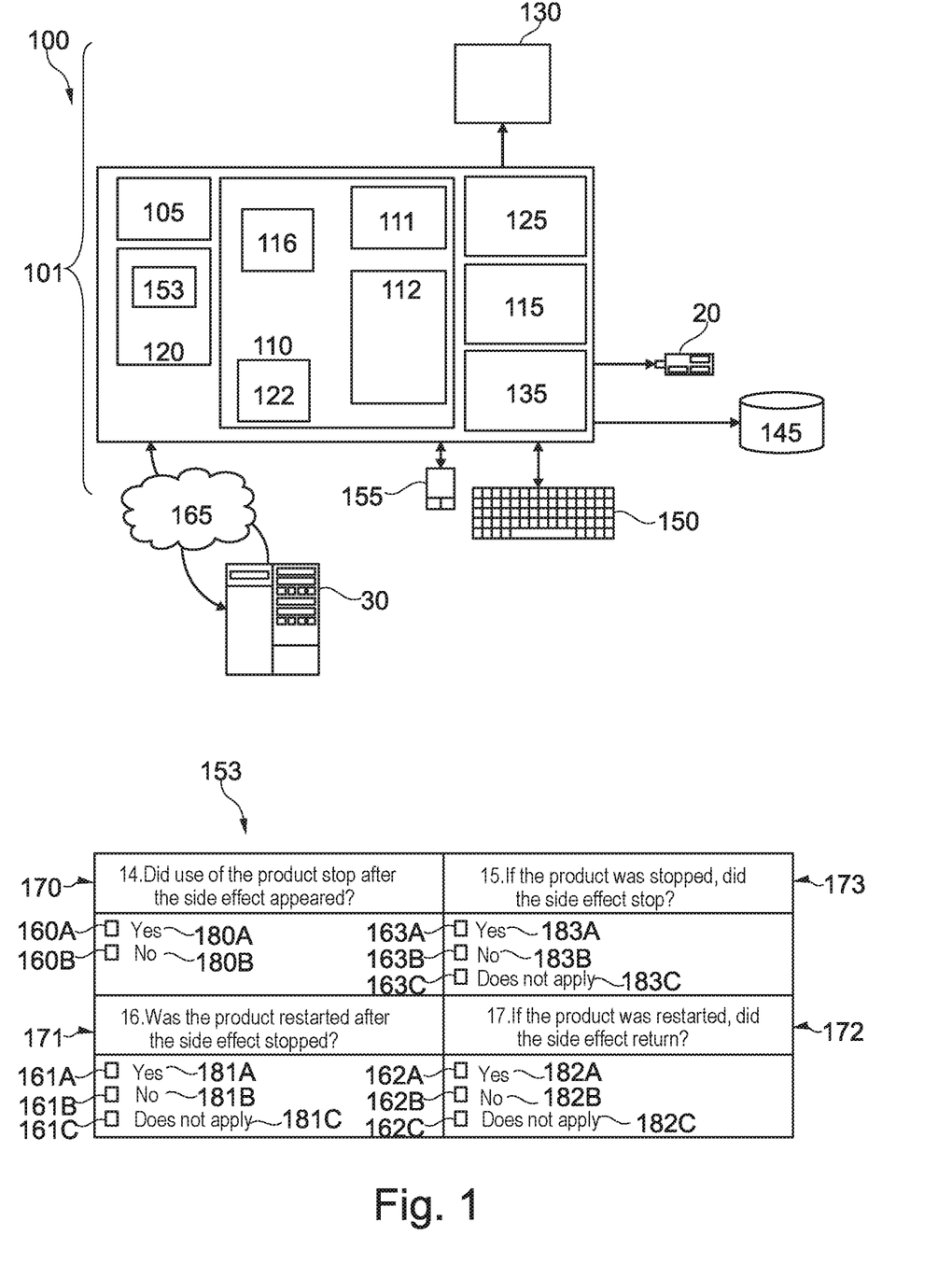
FIG. 1 depicts a block diagram of a general computerized system for implementing method steps as involved in the disclosure.

FIG. 1 represents a general computerized system 100 suited for implementing method steps as involved in the disclosure in one embodiment.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

Figure 2:
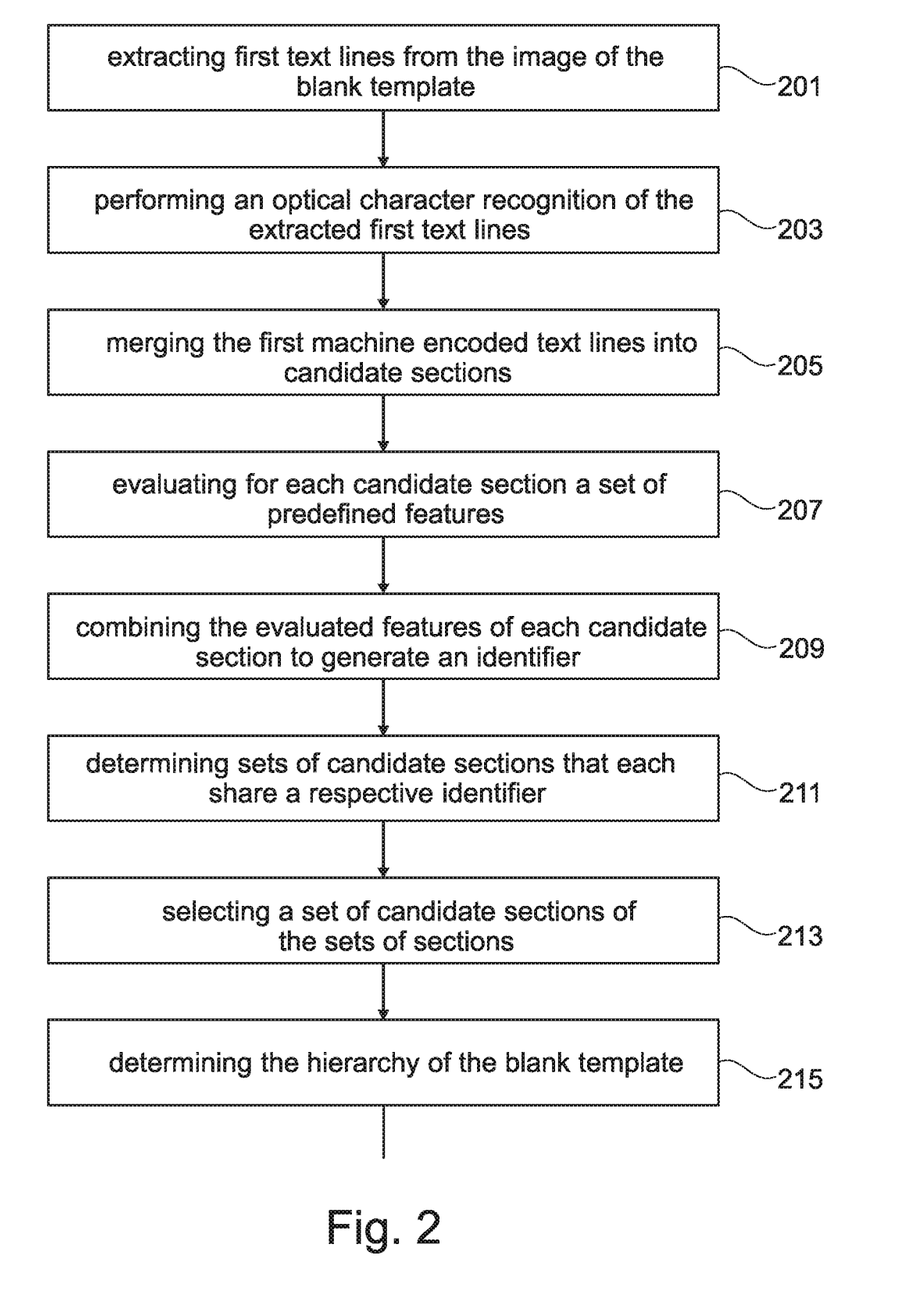
FIG. 2 is a flowchart of a method for extracting information from an image of a filled form document.

In exemplary embodiments, in terms of hardware architecture, as shown in FIG. 2, the computer 101 includes a processor 105, memory (main memory) 110 coupled to a memory controller 115, and one or more input and/or output (I/O) devices (or peripherals) 20, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 2, software in the memory 110 includes instructions 112 e.g. instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

The memory 110 may further store an OCR system 116. The OCR system 116 may be configured to convert printed characters into digital text, enabling to search for or edit a document. The OCR system 116 may further be configured to perform optical mark recognition for processing different fields such as checkboxes in accordance with the present disclosure.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may store one or more images of form documents 153 (scanned form documents). FIG. 1 depicts an example of the form document 153. The form document 153 comprises labeled fields 160A-163C. Each of the labeled fields 160A-163C may have a respective value. The term "field" refers to an element of the document that is utilized by a user for entering data into the document. Examples of fields are text fields, checkboxes etc.

For example, the field 160A is a checkbox which may have a value 'Yes' if the checkbox 160A is ticked. The field 162C is a checkbox which may have a value 'Does not apply' if the checkbox 162C is ticked.

The fields 160A-163C are arranged in sections 170-173. For example, the fields 160A-B belong to the section 170. The fields 161A-C belong to the section 171. The fields 162A-C belong to the section 172. The fields 163A-C belong to the section 172.

Each of the fields 160A-163C is labeled with a respective label 180A-183C. In case for example of a checkbox field, the corresponding label may be the value of the field.

The arrangement of the sections 170-173 and corresponding fields 160A-163C within the form document 153 forms a hierarchy of the form document 153.

The form document 153 may be in an empty format as shown in FIG. 1 (referred to as a blank template of the form document), or in a filled format (referred to as filled form document) where at least part of the fields 160A-163C have values.

FIG. 2 is a flowchart of a method in one embodiment for extracting information from an image of a filled form document e.g. the form document 153 when it is in filled. The filled form document has a blank template 153 as shown in FIG. 1.

In step 201, first text lines may be extracted from the image of the blank template 153 using a text line recognizer of the OCR system 116. The first text lines of step 201 are shown for example surrounded by boxes in the blank template 353A of FIG. 3A. For example, section 170 comprises two first text lines 301A and 301B. Each of the fields 160A-163C and associated labels 180A-183C may form a first text line. For example, field 160A and label 180A may form a first text line 302A; and field 160B and label 180B may form a first text line 302B. The first text lines 303A to 308C may be obtained as described with first lines 301A to 302B.

Figure 3A:
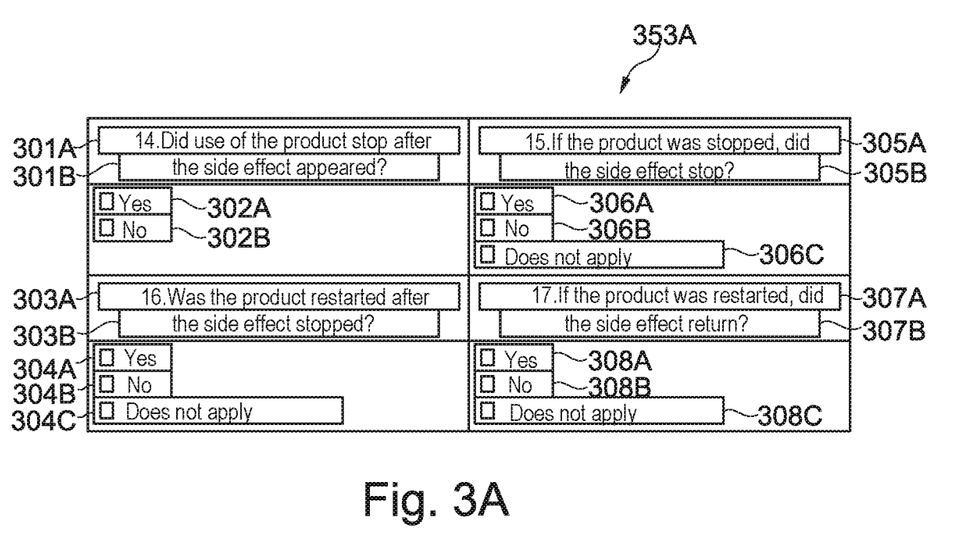
FIG. 3A depicts a structure of a filled form document as determined by at least part of the present method.

In step 203, the OCR system 116 may be used to perform an optical character recognition of the extracted first text lines 301-302 resulting in first machine-encoded text lines.

Figure 3B:
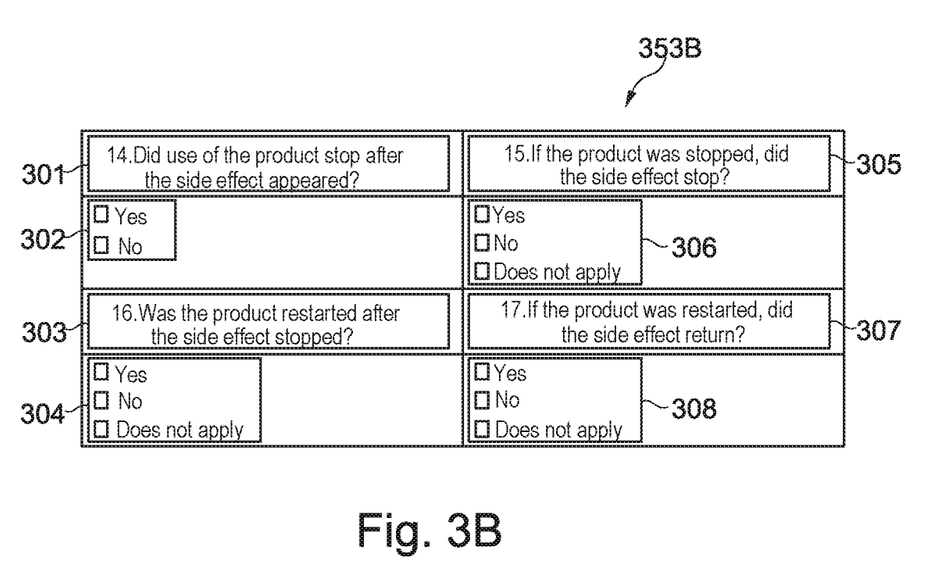
FIG. 3B depicts a structure of a filled form document as determined by at least part of the present method.

In step 205, the first machine encoded text lines may be merged into candidate sections (or regions) based on the location of the first text lines 301-308 in the blank template 353A. The result 353B of the merging is shown in FIG. 3B, where for example, the first text lines 301A and 301B are merged into a candidate section 301 and first text lines 302A-B are merged into candidate section 302. The merging may be performed the technique of vertical merging which is configured to identify two or more mergeable text lines using a rule based technique or a machine learning based technique.

For example, the rule based technique may be implemented as follows: two text lines e.g. 301A and 301B are merged into a region or candidate section if at least one of the following conditions is fulfilled: the vertical distance between the lines 301A and 301B is smaller than the maximum height of the text lines; the horizontal distance between the left-corner of the boxes surrounding the lines 301A and 301B is smaller than the maximum width of the text lines 301A-301B and there is no horizontal lines in between lines 301A and 301B.

In step 207, a set of predefined features indicative of the text lines and their location may be evaluated for each candidate section 301-308. The set of features may be a set of binary visual and typographical features that can be extracted from the text of the candidate sections 301-308. For example, the set of predefined features comprises at least one of font size, font type, position of a character etc.

In step 209, the evaluated features of each candidate section may be combined to generate an identifier of the candidate section 301-308. This step results in multiple identifiers for each of the candidate sections 301-308. The combining of the features may comprise a construction of hash numbers e.g. each identifier may be a hash number. For example, the hash number h of each candidate section may be constructed using the following formula $h=\Sigma_{n=0}^{M} f_n \cdot 2^n$ where $f_n$ represents the $n^{th}$ feature of M features.

In step 211, multiple sets of candidate sections that each share a respective identifier of the multiple identifiers may be identified. For example, sections 301, 305, 303 and 307 may share a same hash number as they have similar structures. Thus, a first set of candidate sections may comprise candidate sections 301, 303, 305 and 307. Another set of candidate sections may for example comprise sections 302, 304, 306 and 308 that may share the same hash number.

In step 213, a selection of a set of candidate sections of the sets of candidate sections that fulfills a predefined selection criterion based on the number of sections and number of respective fields may be performed. For example, the selection criterion may consist of maximizing the number of fields and minimizing the corresponding number of sections.

In one example, the selection criterion may be the following:

$$\min_h \frac{|S|}{\frac{1}{|S|}\sum_{i=0}^{|S|-1} |Q_i|},$$

where S is the number of candidate sections shared by a given identifier and Q is the number of fields in a given candidate section.

In another example, the selection criterion may be the following:

$$\min_h \frac{|S|}{\text{median}\{|Q|\}},$$

where S is the number of candidate sections shared by a given identifier and median{Q} is the median number of fields for a given hierarchy.

In step 215, the hierarchy of the blank template 153 may be determined as the selected set of candidate sections. For example, the set of candidate sections 301, 303, 305 and 307 may be selected and may form the hierarchy of the blank template 153. The hierarchy may be determined by the relative arrangement of the sections 301, 303, 305 and 307 and respective fields within the blank template 153.

For example, the hierarchy may be provided as a JSON file, where each field is represented with a unique identifier e.g. called the entity type. This may enable an output indicative of the blank template 153 that is query-able. The JSON file may further indicate the relative positions of the fields and sections in the template form document. In one example, step 215 may further comprise prompting a user for confirming or adjusting the obtained hierarchy and receiving the confirmed or updated hierarchy e.g. a confirmed or updated JSON file may be received.

In step 217, second text lines may be extracted from the image of the filled form document using the text line recognizer as explained above. For example, a second text line may comprise a label (e.g. Age) and a field with its value (e.g. 65 years).

In step 219, the OCR system 116 may be used, as described above, to perform an optical character recognition of the extracted second text lines resulting in second machine-encoded text lines.

In step 221, the second machine encoded text lines may be merged, as described above, into text regions based on the location of the second text lines.

For each second text line of the filled form document steps 223-227 may be executed.

In step 223, the section of the determined hierarchy that matches the second text line may be identified based on the region of the second text line. For example, a second text line L2 may be the first text line 302A in addition to the fact that the checkbox 160A is ticked. The region of this second text line L2 may be region 302.

In step 225, the first text line of the section that corresponds to the second text line L2 may be determined. This may be performed by performing a comparison between the second text line L2 with each first text line. The first comparison may for example be performed using a similarity metric as described below. Based on the comparison result the label (e.g. question) of the field of the second text line L2 and its position within the filled form may be determined using the determined first text line. For example, if the comparison results in that the second text line L2 corresponds to a first text line that comprise "Age: . . . ", the label 'Age' may be determined to be as the label of the field of the second text line L2 and its position within the filled form document may be determined as well.

The comparison may for example allow for (or take into account of) changes in the typography by for example converting characters to lower-case, remove all the blank spaces and back-to-lines characters, and/or unchecking all the tick boxes. Steps 223-225 may result in labels of fields of the filled form and their positions within the filled form.

In step 227, the determined labels (that result from steps 223-225) may be used for identifying and extracting field values of the second text lines. For example, the determined labels may be subtracted from the second text lines which may result in new text lines that comprise field values. The second text line may further be represented by the text of the section e.g. the second text line L2 may be represented by the label 'Yes' and the value 'Yes' and the text of section 301.

In step 229, each of the field values of step 227 may be compared with the determined labels (result of steps 223-225) for assigning the field value to a respective label of the determined labels. The comparison of step 229 may for example be performed using visual features that make use of the determined positions of the labels. The visual features may for example comprise L1 distance between centroids of bounding boxes of the compared label and field value, L1 distance between top-left corners of bounding boxes of the compared label and field value, and/or L1 distance between closest borders of bounding boxes of the compared label and field value.

Figure 4:
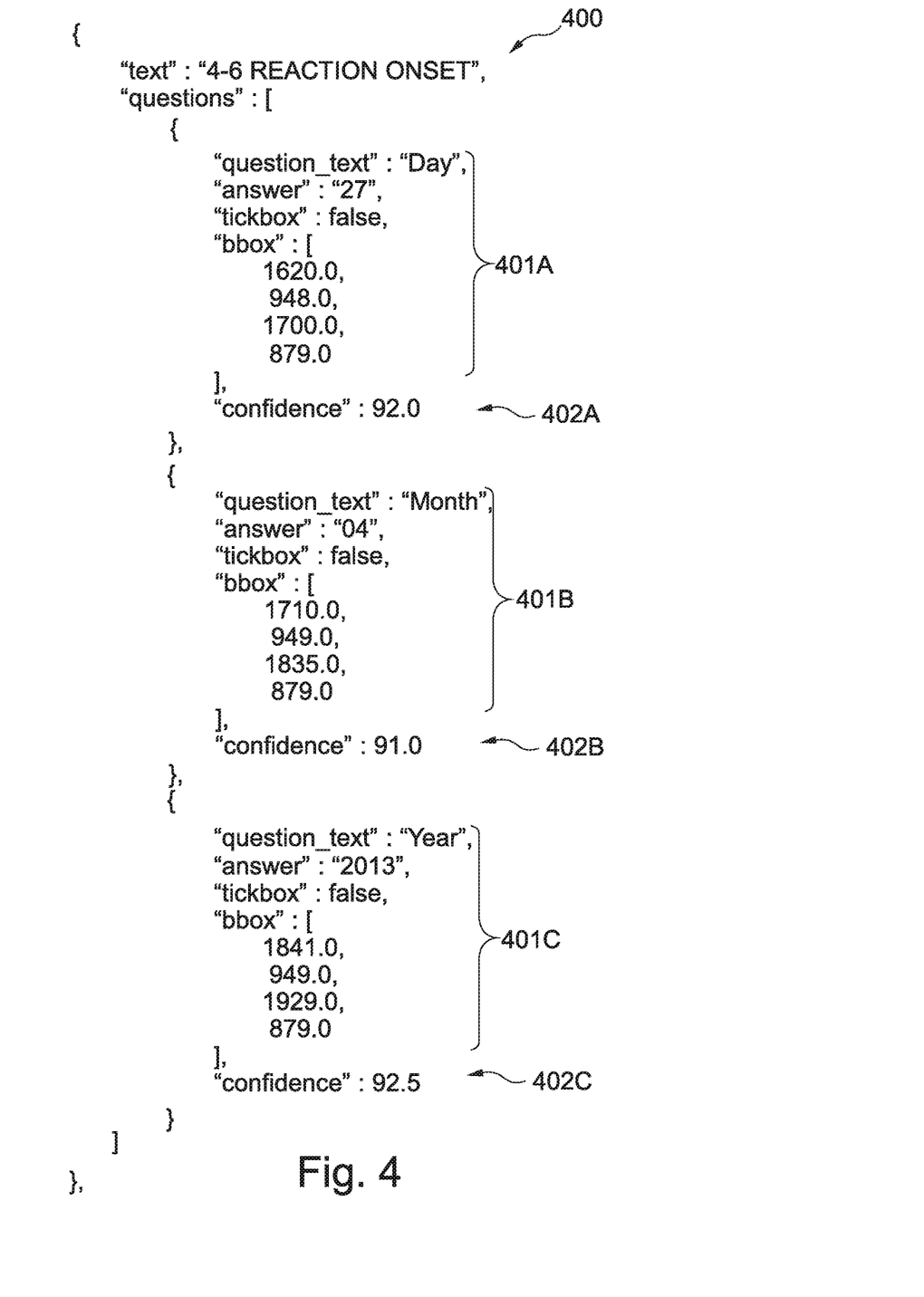
FIG. 4 depicts a structure of JSON file indicating the content of the filled form as determined by the present method.

The results of steps 223-229 may for example be stored in a JSON file as shown in FIG. 4.

Steps 201-229 may for example automatically be executed e.g. upon providing the blank template and filled forms or upon receiving a triggering request from a user. For example steps 217-229 may be repeated for other filled form documents that have that same blank template 153 that is used in steps 201-215. This may enable to extract information for enabling analysis of the content of the filled form documents.

The first comparison performed in step 225 may for example be performed using at least one of the following examples of the similarity metric.

The similarity metric may comprise a normalized Levenshtein distance (NLD). For example, the distance may be determined between one chain of character to another one normalized by the length of the sequence as follows:

$$\text{norm\_lev}(a, b) = 1 - \frac{lev(a, b)}{\max(len(a), len(b))},$$

a and b refer to the first and second text lines to be compared.

The similarity metric may further comprise the word accuracy (WA) which expresses the percentage of words correctly predicted in the first and second text lines to be compared as follows:

$$acc(a, b) = \frac{1}{N} \sum_{n=1}^{\infty} \mathbb{1}_{a_n \in b},$$

a and b refer to the first and second text lines to be compared. N is the number of words in the first text line, and $\mathbb{1}_{a_n \in b}$ is a function which is equal to one if a word $a_n$ of the first text line matches (e.g. present in) the second text line b, otherwise it is equal 0.

The similarity metric may further comprise a combined word accuracy (WCA) which computes for each word of the first or second text lines its normalized Levenshtein distance and average it over the entire sequence as follows:

$$\text{comb\_acc}(a, b) = \frac{1}{N} \sum_{n=1}^{\infty} \text{norm\_lev}(a_n, b_i),$$

where a and b refer to the first and second text lines to be compared and $b_i$ is the closest word to word $a_n$.

The similarity metric may further comprise a field detection accuracy (FDA) which expresses for a given label the percentage of field values obtained from multiple filled form documents that match the given question. For example, the FDA may quantify how many forms among 1000 filled forms of the same template form that been processed in accordance with the present method and provided the right field values that matches the given question e.g. if the question is "which address" how many of the 1000 forms provided the address value as being associated with the given question after being processed by the present method. This may indicate how accurate the present method may be.

FIG. 3A depicts a structure of a filled form document as determined by at least part of the present method in one embodiment. The structure shown in FIG. 3A is the result of step 201.

FIG. 3B depicts a structure of a filled form document as determined by at least part of the present method in one embodiment. The structure shown in FIG. 3A is the result of step 205.

FIG. 4 depicts a structure of a JSON file 400 indicating the content of the filled form as determined by the present method in one embodiment. For example, the JSON file describes the content of three second text lines 401A-C of the filled form that is processed by the present method. For each text line 401A-C, the label, the value and the location is determined. For example, for text line 401A, the label is "Day" and the value of the field of the text line 401A is 27, and the location of the text line 401A is determined by coordinates indicating the width (x1 and x2) and the height (y1 and y2) of the text line 401A e.g. x1=948.0, x2=879 and y1=1620 and y2=1700. For text line 401B, the label is "Month" and the value of the field of the text line 401B is 4, and the location of the text line 401B is determined by coordinates indicating the width (x1 and x2) and the height (y1 and y2) of the text line 401B e.g. x1=949.0, x2=879 and y1=1710 and y2=1835. For text line 401C, the label is "Year" and the value of the field of the text line 401C is 2013, and the location of the text line 401C is determined by coordinates indicating the width (x1 and x2) and the height (y1 and y2) of the text line 401C e.g. x1=949.0, x2=879 and y1=1841 and y2=1929.

In addition each of the text lines 401A-C is associated with a probability value or confidence value 402A-C indicative of the probability that the text line 401A-C corresponds to the respective first text lines of the blank template.

In another example, a method and system is provided for extracting structured information from scanned forms through visual computing and machine learning. The method comprises analyzing and detecting the structure of empty forms to provide an abstract hierarchical representation of the forms; and linking content of filled forms to the abstract hierarchical representation of the forms.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of extracting information from an image of a filled form document, the form document comprising labeled fields comprising values and arranged in sections of the document, the method comprising:
   providing an image of a blank template of the form document;
   extracting first text lines from the image of the blank template using a text line recognizer of an optical character recognition (OCR) system;
   performing using the OCR system an optical character recognition of the extracted first text lines resulting in first machine-encoded text lines;
   merging the first machine encoded text lines into candidate sections based on the location of the first text lines in the blank template;
   evaluating for each candidate section a set of predefined features indicative of the text lines and their location;
   combining the evaluated features of each candidate section to generate an identifier of the candidate section, resulting in multiple identifiers;
   determining sets of candidate sections that each share a respective identifier of the multiple identifiers;
   selecting a set of candidate sections of the sets of sections that fulfills a predefined selection criterion based on the number of sections and number of respective fields;
   determining as the hierarchy of the blank template the selected set of candidate sections;
   extracting second text lines from the image of the filled form document using the text line recognizer;
   performing using the OCR system an optical character recognition of the extracted second text lines resulting in second machine-encoded text lines;

merging the second machine encoded text lines into text regions based on the location of the second text lines;

for each second text line of the filled form document:
identifying the section of the determined hierarchy that matches the second text line based on the region of the second text line;
determining the first text line of the section that corresponds to the second text line by comparing the second text line with the first text lines, and determining the label of the field of the second text line and the position of the label within the filled form using the determined first text line;

using the determined labels for identifying and extracting field values of the second text lines;

comparing each of the field values with the determined labels for assigning the field value to a respective label of the determined labels.

2. The method of claim 1, wherein comparing the first and second text lines is performed using a similarity metric indicative of the similarity between words of the first and second text lines.

3. The method of claim 2, the similarity metric comprises at least one of Levenshtein distance, word accuracy (WA), combined word accuracy (CWA) and field detection accuracy (FDA).

4. The method of claim 1, wherein the selection criterion is the following:

$$\min_h \frac{|S|}{\frac{1}{|S|}\sum_{i=0}^{|S|-1}|Q_i|},$$

where S is the number of candidate sections shared by a given identifier and Q is the number of fields in a given candidate section.

5. The method of claim 1, wherein the selection criterion is the following:

$$\min_h \frac{|S|}{\text{median}\{|Q|\}},$$

where S is the number of candidate sections shared by a given identifier and median{Q} is the median number of fields for a given hierarchy.

6. The method of claim 1, wherein the combining the evaluated features into an identifier h is performed as follows $h=\Sigma_{n=0}^{M} f_n \cdot 2^n$ where $f_n$ represents the $n^{th}$ feature of M features.

7. The method of claim 1, wherein the set of predefined features comprises at least one of: font size, font type, position of a character, background color, indication of a character being an uppercase or lowercase character.

8. The method of claim 1, wherein the comparing of the field value with a label of the determined labels comprises computing a probability that the field value and the label corresponds to each other using visual features, wherein the visual features comprise L1 distance between centroids of bounding boxes of the compared label and field value, L1 distance between top-left corners of bounding boxes of the compared label and field value, L1 distance between closest borders of bounding boxes of the compared label and field value.

9. The method of claim 1, wherein the merging of the machine encoded text lines is performed using a vertical merging technique.

10. The method of claim 1, wherein the identifier of the text region comprises a hash value.

11. The method of claim 1, further comprising providing the hierarchy of the filled form document as an xml file comprising relative positions of the text lines and sections.

12. The method of claim 1, wherein the field value comprises a value that is input of the field and/or information indicative of the field.

13. A computer program product comprising a computer-readable storage medium having computer-readable program code embodied therewith, the computer-readable program code configured to implement steps of the method according to claim 1.

14. A computer system for extracting information from an image of a filled form document, the form document comprising labeled fields comprising values and arranged in sections of the document, the computer system comprising an image of a blank template of the form document, the computer system being configured for:

extracting first text lines from the image of the blank template using a text line recognizer of an optical character recognition (OCR) system;

performing using the OCR system an optical character recognition of the extracted first text lines resulting in first machine-encoded text lines;

merging the first machine encoded text lines into candidate sections based on the location of the first text lines in the blank template;

evaluating for each candidate section a set of predefined features indicative of the text lines and their location;

combining the evaluated features of each candidate section to generate an identifier of the candidate section, resulting in multiple identifiers;

determining sets of candidate sections that each share a respective identifier of the multiple identifiers;

selecting a set of candidate sections of the sets of sections that fulfills a predefined selection criterion based on the number of sections and number of respective fields;

determining as the hierarchy of the blank template the selected set of candidate sections;

extracting second text lines from the image of the filled form document using the text line recognizer;

performing using the OCR system an optical character recognition of the extracted second text lines resulting in second machine-encoded text lines;

merging the second machine encoded text lines into text regions based on the location of the second text lines;

for each second text line of the filled form document:
identifying the section of the determined hierarchy that matches the second text line based on the region of the second text line;
determining the first text line of the section that corresponds to the second text line by comparing the second text line with the first text lines, and determining the label of the field of the second text line and the position of the label within the filled form using the determined first text line;

using the determined labels for identifying and extracting field values of the second text lines;

comparing each of the field values with the determined labels for assigning the field value to a respective label of the determined labels.

\* \* \* \* \*